United States Patent [19]

Hinman et al.

[11] Patent Number: 4,481,223
[45] Date of Patent: Nov. 6, 1984

[54] DECAFFEINATION WITH TREATED ACTIVATED CARBON

[75] Inventors: David C. Hinman, Tarrytown; Fouad Z. Saleeb, Pleasantville, both of N.Y.

[73] Assignee: General Foods Corporation, White Plains, N.Y.

[21] Appl. No.: 541,498

[22] Filed: Oct. 13, 1983

[51] Int. Cl.$^3$ .............................................. A23F 5/22
[52] U.S. Cl. .................................... 426/422; 426/427; 544/274
[58] Field of Search ............... 426/422, 427; 544/274, 544/275

[56] References Cited
FOREIGN PATENT DOCUMENTS
1123656 5/1982 Canada .............................. 426/427

Primary Examiner—Joseph Golian
Attorney, Agent, or Firm—Thomas A. Marcoux; Richard L. Crisona; Thomas R. Savoie

[57] ABSTRACT

An aqueous coffee extract is decaffeinated with a treated activated carbon. The activated carbon is first contacted with an ethyl cellulose solution in order to adsorb the ethyl cellulose on the carbon. The ethyl cellulose-containing activated carbon is then dried and contacted with an aqueous coffee extract. The substantially decaffeinated extract is subsequently separated from the carbon.

9 Claims, No Drawings

DECAFFEINATION WITH TREATED ACTIVATED CARBON

TECHNICAL FIELD

The present invention relates to a method of decaffeinating an aqueous coffee extract. More particularly, the invention relates to treating activated carbon by adsorbing ethyl cellulose thereon and subsequently contacting the treated carbon with an aqueous coffee extract. A substantially decaffeinated extract may then be separated from the activated carbon.

BACKGROUND ART

Two commercial coffee decaffeination methods currently dominate the coffee industry. One of the more widely used methods is disclosed in U.S. Pat. No. 2,309,092 to Berry et al. wherein green coffee beans are extracted with a caffeine-deficient aqueous extract of green coffee solubles. After extraction, the caffeine-laden extract is stripped of caffeine by contact with a halogenated organic solvent, such as methylene chloride. The second widely used decaffeination method involves extracting the green coffee beans directly with an organic solvent as disclosed in U.S. Pat. No. 3,771,263 to Patel et al.

Early attempts at decaffeinating with an adsorbent are disclosed in U.S. Pat. Nos. 1,930,257 to Stelkens and 2,198,859 to Burgin wherein activated carbon is used to adsorb caffeine from an extract. The disclosed inventions are commercially impractical though, because substantial amounts of non-caffeine solids, particularly chlorogenic acid, are adsorbed from the extract along with the adsorption of caffeine.

Recent disclosures are directed to making decaffeination with adsorbents more feasible. One process wherein the carbon is treated with a solution of carbohydrates prior to decaffeination is described in Canadian Pat. No. 1,123,656. While the method limits the net loss of non-caffeine solids from the coffee extract, the extract does lose chlorogenic acid in what is believed to be an essentially even exchange of chlorogenic acid for carbohydrates adsorbed on the activated carbon. The loss of the chlorogenic acid from the coffee extract may have negative flavor implications.

It is an object of the present invention to provide a method of decaffeinating an aqueous coffee extract using a treated activated carbon, which method limits the net loss of non-caffeine solids from said extract.

A further object of the invention is to provide a decaffeination method using a treated activated carbon, which method substantially reduces the loss of chlorogenic acid from an extract.

DISCLOSURE OF THE INVENTION

It has now been found that the objects of the present invention are met by a decaffeination method wherein activated carbon is contacted with an ethyl cellulose solution prior to contacting said activated carbon with an aqueous coffee extract. Ethyl cellulose is adsorbed on the activated carbon, substantially reducing the net loss of non-caffeine solids, particularly chlorogenic acid, from the aqueous coffee extract.

Ethyl cellulose is a relatively inexpensive, commercially available compound which has been approved for use in food processing. Chemically, ethyl cellulose is cellulose in which ethoxyl units have been substituted at the glucose hydroxyl units. There are three such hydroxyl units/anhydroglucose unit in cellulose. The preferred degree of substitution has been found to be between, on average, 2.42 and 2.53 ethoxyl units/anhydroglucose units. Though ethyl cellulose with a lower degree of substitution may be used, ethyl cellulose in the above described range is more effective in lowering the adsorption of chlorogenic acid during decaffeination of a coffee extract.

One of the more important properties of the ethyl cellulose in relation to the present invention is the average molecular weight of said ethyl cellulose. It is believed that ethyl cellulose hinders adsorption of chlorogenic acid by blocking those pores in the activated carbon which typically adsorb the acid. The activated carbon contemplated for use herein has a total pore volume of about 0.90 cc/gm. Approximately 33% of said volume is comprised of pores having a diameter between 18 Å and 25 Å, which pores account for about 90% of the surface area of the activated carbon. If the ethyl cellulose is of too high or too low a molecular weight, the pores which adsorb chlorogenic acid will not be blocked and the effectiveness of the present method will be diminished.

Although the absolute molecular weight of a particular ethyl cellulose is difficult to measure, a good indication of said molecular weight is given by the viscosity of an ethyl cellulose solution, with a lower viscosity indicating a lower average molecular weight. Ethyl cellulose having a viscosity between 10 cps and 40 cps measured analytically at a concentration of 5% by weight in an 80:20 by weight toluene/ethanol solution at 25° C. has been discovered to reduce the amount of chlorogenic acid adsorbed on activated carbon. The preferred ethyl cellulose has a viscosity of 22 cps under the same conditions. Such a preferred ethyl cellulose is available commercially under the trade name Ethyl Cellulose N22-NF from Hercules Co. of Wilmington, Del.

Activated carbon is treated with a solution of ethyl cellulose in order to adsorb the ethyl cellulose thereon. The water-insoluble ethyl cellulose is preferably dissolved in an alcohol such as ethanol. A solution of between 2% by weight and 5% by weight ethyl cellulose in ethanol has been found to be particularly convenient. Contact of the activated carbon and said solution may be in any vessel providing for good solid-liquid contact; slurrying the carbon in the ethyl cellulose solution is one example. Alternatively, said solution may be circulated through a bed of activated carbon contained in an elongated column. Regardless of the method chosen, contact is maintained for a sufficient period of time to adsorb the capacity of ethyl cellulose on the carbon, typically between about 1.5% and 2.0% of the dry weight of the ethyl cellulose-containing activated carbon. After the activated carbon has adsorbed the limit of ethyl cellulose, the carbon is separated from said solution, which carbon may then be dried to remove any residual alcohol.

Ethyl cellulose-containing activated carbon is then contacted with an aqueous coffee extract in order to substantially decaffeinate the extract while substantially limiting the amount of chlorogenic acid adsorbed. The aqueous coffee extracts intended for use in the present invention include a caffeine-laden green coffee extract such as one derived from the hereinabove described Berry et al. process, as well as an extract of roasted coffee such as a typical commercial coffee extract well known as an intermediate in the production of a dry soluble coffee. Both said aqueous coffee extracts contain chlorogenic acid which acid is preferably retained in the coffee extract during decaffeination in order to preserve the proper coffee flavor.

Contact of the ethyl cellulose-containing activated carbon and the coffee extract may be by any method providing good solid-liquid contact. For example, contact may be batch-wise wherein the carbon is slurried in the aqueous coffee extract. Preferably, contact of the two streams is in a semi-continuous or continuous manner such as in a multi-section, counter-current battery wherein the caffeine-laden extract enters the section containing the most spent activated carbon and substantially decaffeinated coffee extract is withdrawn from the section containing the least spent activated carbon. Once the carbon in the most spent section has adsorbed its limit of caffeine, the section is isolated, a new section with fresh ethyl cellulose-containing carbon is added and the streams are adjusted to conform to the above description. Alternatively, contact of the carbon and the aqueous coffee extract may be in a so-called pulse column wherein a small portion or "pulse" of spent carbon is discharged from the bottom of the counter-current column as a fresh pulse of said carbon is added to the top of the column.

Irrespective of the manner of contact chosen, the activated carbon is separated from the extract after substantially all the caffeine, preferably greater than 95% by weight, has been removed from the coffee extract. In the case of green coffee extract, the substantially decaffeinated extract is returned to a process such as described in the Berry et al. patent and may then be used to extract fresh green coffee beans. Roasted coffee extract decaffeinated by the present method may be processed into a decaffeinated dry soluble coffee by methods well known in the art.

The activated carbon which has adsorbed its limit of caffeine may be regenerated and returned to the present method as fresh activated carbon. The carbon may be thermally reactivated wherein essentially all matter adsorbed thereon is burned away. Such thermal reactivation causes the loss of the commercially valuable caffeine though. An alternative method of regenerating the carbon is described in U.S. Pat. No. 4,298,736 to Katz et al. The spent activated carbon is regenerated by contact with a solvent, such as glacial acetic acid or an azeotrope containing acetic acid. The valuable caffeine is then recovered from solution.

As hereinbefore noted, the present invention is effective in substantially reducing the amount of chlorogenic acid adsorbed during decaffeination. The method of the present invention may be used in combination with other decaffeination processes if it is desired to reduce adsorption of said acid even further. For instance, the present invention may be used with processes as known in the art wherein one or more carbohydrates are also adsorbed on the activated carbon. Ethyl cellulose is first adsorbed on the activated carbon, followed by adsorption of carbohydrates on said carbon.

The following examples are intended to illustrate certain embodiments of the present invention. The examples are not intended to limit the invention beyond what is claimed below.

Example 1

1. 0.375 gm. of Ethyl Cellulose N22-NF manufactured by Hercules Co. of Wilmington, Del. was dissolved in 75 ml of 95% ethanol.

2. 5 gm. of activated carbon solid under the name of CPG by Calgon Co. of Pittsburgh, Pa. was soaked in the solution of step 1 for three hours at 82° C. in order to adsorb ethyl cellulose thereon. The CPG carbon had a pore volume of about 0.90 cc/gm, 33% of which volume was comprised of pores having a diameter between 18 Å and 25 Å.

3. The solution was then drained from the activated carbon, which carbon was then dried in a vacuum oven. The dry carbon was found to contain 1.8% by weight ethyl cellulose based on analysis of the supernatant solution.

4. The carbon was then shake in 50 ml. of aqueous green coffee extract for four hours at 82° C. A 5 gm. sample of untreated carbon was shaken in a separate 50 ml. of the same green coffee extract. The results for the ethyl cellulose treated carbon and the control carbon are shown below in Table 1.

TABLE 1

|  | caffeine conc. % by weight | chlorogenic acid conc. % by weight | total solids conc. % by weight | caffeine adsorption (%)* | chlorogenic adsorption (%)* |
|---|---|---|---|---|---|
| Starting extract | .622 | 4.35 | 25.2 | | |
| Supernatant extract from treated carbon | .232 | 4.23 | 23.4 | 3.9 | 1.2 |
| Supernatant extract from control carbon | .189 | 2.92 | 21.9 | 4.3 | 14.3 |

*as a percentage of the dry weight of the carbon containing the adsorbed solids.

Thus, the selectivity of the carbon, expressed in (adsorption of caffeine as % of carbon)/(adsorption of chlorogenic acid as % of carbon), increased from 0.3 to 3.2 with the ethyl cellulose treatment, an improvement of better than a factor of 10.

Example 2

1. A portion of CPG activated carbon had ethyl cellulose adsorbed thereon. 0.4 gm of Ethyl Cellulose N22-NF was dissolved in 50 ml of ethanol per every 20 gm. of carbon so treated.

2. The carbon was soaked in the ethyl cellulose solution at about 20° C. for 16 hours. The solution was then drained from the activated carbon, which carbon was then dried in a vacuum oven at 80° C. The carbon was found to contain 1.6% by weight ethyl cellulose based on analysis of the supernatant solution.

3. A 20 gm. of the carbon, having a size distribution not retained on a 12-mesh but retained on a 40-mesh (U.S. Standard Sieve Screen), was loaded into an elongated, glass laboratory column. One liter of green coffee extract was then passed through the column at a rate of 0.64 ml/min (superficial velocity of 0.67 cm/min) and at a temperature of 82° C.

4. The procedure of step 3 was repeated on an untreated carbon control. The results for the ethyl cellulose treated carbon and the control carbon are shown below in Table 2.

TABLE 2

| carbon | % caffeine on carbon | % chlorogenic acid on carbon | % total solids on carbon | selectivity |
|---|---|---|---|---|
| treated carbon | 4.5 | 9.7 | 12.0 | .46 |

TABLE 2-continued

| carbon | % caffeine on carbon | % chlorogenic acid on carbon | % total solids on carbon | selectivity |
|---|---|---|---|---|
| control carbon | 3.3 | 17.5 | 35.0 | .19 |

The % caffeine or chlorogenic acid on carbon is defined as in Example 1. The selectivity is also defined as in Example 1.

The selectivity of the carbon increased from 0.19 to 0.46 with the ethyl cellulose treatment which represents an improvement of a factor of 2.5.

What is claimed is:

1. A method of decaffeinating an aqueous coffee extract which comprises:
   (a) contacting activated carbon with a solution of ethyl cellulose to adsorb the ethyl cellulose on said activated carbon;
   (b) separating the ethyl cellulose-containing activated carbon from said solution;
   (c) contacting the ethyl cellulose-containing activated carbon with an aqueous coffee extract for a sufficient period of time to remove a substantial portion of the caffeine from said extract; and
   (d) separating the activated carbon from the substantially decaffeinated aqueous coffee extract.

2. The method of claim 1 wherein between 1.5% and 2.0% by weight of the ethyl cellulose-containing carbon is ethyl cellulose.

3. The method of claim 2 which further comprises drying the activated carbon after contact with the ethyl cellulose solution but before contact with the aqueous coffee extract.

4. The method of claim 2 wherein the ethyl cellulose has a viscosity between 10 cps and 40 cps at a concentration of 5% by weight in an 80:20 by weight toluene/ethanol solution at 25° C.

5. The method of claim 4 wherein the activated carbon has a pore volume of about 0.90 cc/gm, about 33% of which volume is comprised of pores having diameters between 18 Å and 25 Å.

6. The method of claim 1 wherein the solution of ethyl cellulose comprises between 2% by weight and 5% by weight ethyl cellulose.

7. The method of claim 1 wherein the aqueous coffee extract is an extract of roasted coffee.

8. The method of claim 1 wherein the aqueous coffee extract is an extract of unroasted coffee.

9. The method of claim 1 which further comprises contacting the ethyl cellulose-containing activated carbon with the aqueous coffee extract in a multi-section, counter-current battery having at least three sections.

* * * * *